United States Patent [19]

Furuta et al.

[11] Patent Number: 5,498,689

[45] Date of Patent: Mar. 12, 1996

[54] MODIFIED POLYPHENYLENE ETHER, PROCESS FOR PREPARING THE SAME AND THERMOPLASTIC RESIN COMPOSITION COMPRISING THE SAME

[75] Inventors: Motonobu Furuta, Chiba; Takanari Yamaguchi; Kazutoshi Ohashi, both of Tsukuba, all of Japan

[73] Assignee: Sumitomo Chemical Company, Limited, Osaka, Japan

[21] Appl. No.: 211,240

[22] PCT Filed: Jul. 27, 1993

[86] PCT No.: PCT/JP93/01050

§ 371 Date: Apr. 29, 1994

§ 102(e) Date: Apr. 29, 1994

[87] PCT Pub. No.: WO94/03524

PCT Pub. Date: Feb. 17, 1994

[30] Foreign Application Priority Data

Jul. 29, 1992 [JP] Japan ............................. 4-202337
Aug. 31, 1992 [JP] Japan ............................. 4-231132

[51] Int. Cl.$^6$ .................................................. C08G 65/38
[52] U.S. Cl. ..................... 528/214; 528/86; 528/210; 528/212; 525/397
[58] Field of Search ........................... 528/86, 210, 212, 528/214

[56] References Cited

U.S. PATENT DOCUMENTS

| | | | |
|---|---|---|---|
| 4,054,553 | 10/1977 | Olander | 528/176 |
| 4,098,846 | 7/1978 | Olander | 528/215 |
| 4,647,297 | 3/1987 | Zampini | 55/158 |

FOREIGN PATENT DOCUMENTS

| | | |
|---|---|---|
| 0542232 | 1/1990 | European Pat. Off. . |
| 0438128 | 7/1991 | European Pat. Off. . |
| 0352486 | 5/1993 | European Pat. Off. . |
| 2313413 | 12/1976 | France . |
| 1297428 | 11/1989 | Japan ............................. C08G 65/00 |

OTHER PUBLICATIONS

Database WPI, Derwent Publications Ltd., London, GB; AN 93–224360(28) & JP A–5 148 357, 15 Jun. 1993 (Abstract).

Primary Examiner—James J. Seidleck
Assistant Examiner—Terressa M. Mosley
Attorney, Agent, or Firm—Birch, Stewart, Kolasch & Birch

[57] ABSTRACT

A modified polyphenylene ether comprising repeating units of the formula (1):

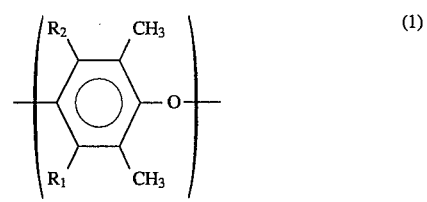

wherein $R_1$ and $R_2$ are, independently from each other, a hydrogen atom or a hydrocarbon group having 1 to 20 carbon atoms and having a number average polymerization degree of 20 to 12,000, in which 0.02/X to 1/X of methyl groups at the 2- and/or 6-positions of phenylene group are substituted by an aminomethyl group wherein X is a number average polymerization degree, a process for preparing the same, and a thermoplastic resin composition containing (A) 1 to 75% by weight of the above modified polyphenylene ether and (B) 99 to 25% by weight of a liquid crystalline polyester.

Since this modified polyphenylene ether includes a highly reactive primary amine on the polymer side chain, it is preferably used in a wide range as a component of various compositions or polymer alloys. The thermoplastic resin composition is excellent in heat resistance, mechanical properties and appearance and gloss of a molded article.

11 Claims, 3 Drawing Sheets

Heating weight change of PPE in nitrogen atmosphere R-1

Heating weight change of PPE in nitrogen atmosphere A-1

MODIFIED POLYPHENYLENE ETHER, PROCESS FOR PREPARING THE SAME AND THERMOPLASTIC RESIN COMPOSITION COMPRISING THE SAME

This application is a continuation of PCT/JP93/01050 filed Dec. 7, 1994.

FIELD OF THE INVENTION

The present invention relates to a novel modified polyphenylene ether comprising repeating units in which a methyl group at 2- and/or 6-position of a phenylene group in the polyphenylene ether is substituted with an aminomethyl group, and a process for preparing the same.

The present invention also relates to a novel thermoplastic resin composition which can be used, for example, in the production of a molded article by injection molding or extrusion molding.

PRIOR ART

In general, a polyphenylene ether is a resin having various good properties such as heat resistance, hot water resistance, dimensional stability and mechanical and electrical properties. On the other hand, has some drawbacks such as its molding property is not good because of its high melt viscosity, its chemical resistance is not good and its impact resistance is low. To improve such drawbacks of the polyphenylene ether, it has been alloyed with another resin or modified.

For example, Japanese Patent KOKAI Publication No. 897/1977 discloses a process for modifying a polyphenylene ether using an aliphatic secondary amine as one component of a polymerization catalyst. Japanese Patent KOKAI Publication No. 68024/1992 discloses a process for preparing a polyphenylene ether having a terminal secondary amino group comprising reacting a polyfunctional isocyanate with the polyphenylene ether, and Japanese Patent KOKAI Publication No. 313523/1989 discloses a process for preparing a polyphenylene ether having a terminal functional group containing a secondary or tertiary amino group. Japanese Patent KOKAI Publication No. 297428/1989 discloses a polyphenylene ether copolymer having an alkyl-substituted tertiary amine on a methylene group at the 2-position. Japanese Patent KOKAI Publication No. 234421/1989 relates to a polyphenylene ether copolymer having a partly aryl-substituted tertiary amine on a side methylene group at the 2-position.

Japanese Patent KOKAI Publication No. 503464/1988 relates to a polyphenylene ether having a polyalkylene dicarboxylate. Japanese Patent KOKAI Publication No. 37365/1990 discloses a polyphenylene ether having a primary amino group on a propylene group in a side chain.

Different from a crystalline polymer such as polyethylene terephthalate or polybutylene terephthalate, a liquid crystalline polyester does not suffer from tangling of molecules in a molten state since the molecules are stiff, forms a polydomain having a crystal state, and molecular chains are highly orientated in a flow direction at a low shear. Then, the liquid crystalline polyester is generally called a thermotropic liquid crystal polymer. Because of such specific behaviors, its melt flowability is excellent and it can easily provide a thin-wall molded article having a thickness of about 0.2 to 0.5 mm, and the molded article advantageously has a high strength and high stiffness, while the drawbacks are that its anisotropy is large and its weld strength is very low.

In addition, the liquid crystalline polyester is expensive, which is another problem. In the market, it is highly desired to provide a liquid crystalline polyester resin composition which maintains good heat resistance and mechanical properties of the liquid crystalline polyester, has improved weld strength and is cheap.

To improve the molding processability and strength of the liquid crystalline polyester by the addition of an amorphous polymer to the liquid crystalline polyester, Japanese Patent KOKAI Publication No. 115357/1981 describes the improvement of melt processability of the liquid crystalline polyester by the addition of a polymer such as a polyphenylene ether to the liquid crystalline polyester.

Further, Japanese Patent KOKAI Publication No. 97555/1990 describes the blending of various polyallylene oxides in the liquid crystalline polyester to improve the soldering heat resistance.

However, some of the modified polyphenylene ethers prepared by the above described processes are easily decomposed in the processing to generate bad odor or decrease the physical properties, some of them have insufficient reactivities of the functional groups which are introduced in the molecular chains, or some of them are expensive.

There has not been obtained an economical modified polyphenylene ether comprising repeating units in which a methyl group in the polyphenylene ether is substituted with a highly reactive aminomethyl group, and such modified polyphenylene ether has been highly desired by the market.

A composition comprising the liquid crystalline polyester having a high molding temperature and an amorphous polymer having a lower molding temperature than that such as the polyphenylene ether may have improved melt processability, but the molded article has poor appearance due to thermal decomposition of the compounded resins in the molding step. In addition, such composition has insufficient mechanical properties and heat resistance.

It may be effective to improve compatibility by blending a modified polyphenylene ether in which a functional group is introduced in the liquid crystalline polyester. However, such blending increases the cost, and in some cases, a monomer having the functional group or oligomers remain in the composition and decrease the physical properties of the composition, which causes some problems.

Therefore, it is highly desired by the market to provide a thermoplastic resin composition which contains a highly reactive functional group such as a primary amine in a molecule, comprises a cheap modified polyphenylene ether and a liquid crystalline polyester, and has excellent physical properties.

SUMMARY OF THE INVENTION

As a result of an extensive study to solve the above problems, the present invention has been completed.

Accordingly, the present invention provides a modified polyphenylene ether, a process for preparing the same, and a liquid crystalline polyester resin composition as described below:

(I) A modified polyphenylene ether comprising repeating units of the formula (1):

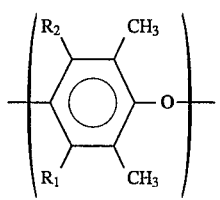

(1)

wherein $R_1$ and $R_2$ are, independently from each other, a hydrogen atom or a hydrocarbon group having 1 to 20 carbon atoms and having a number average polymerization degree of 20 to 12,000, in which $0.02/X$ to $1/X$ of methyl groups at the 2- and/or 6-positions of phenylene group are substituted by an aminomethyl group wherein X is a number average polymerization degree.

(II) A process for preparing a modified polyphenylene ether comprising polymerizing a nucleus-substituted phenol of the formula (2):

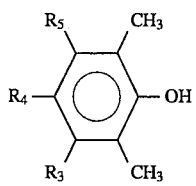

(2)

wherein $R_3$, $R_4$ and $R_5$ are, independently from each other, a hydrogen or a hydrocarbon group having 1 to 20 carbon atoms using an oxidative coupling catalyst in the presence of an amine of the formula (3):

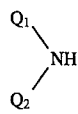

(3)

wherein $Q_1$ and $Q_2$ are, independently from each other, a hydrogen, an alkyl group having 1 to 24 carbon atoms or an aralkyl group having 7 to 24 carbon atom, provided that $Q_1$ and $Q_2$ are not simultaneously hydrogen atoms, or $Q_1$ and $Q_2$ are both alkylene groups and forms a ring, in an amount of 0.001 to 0.2 mole per one mole of the nucleus-substituted phenol, and melt kneading the resulting polyphenylene ether.

(III) A liquid crystalline polyester resin composition comprising (A) 1 to 75% by weight of a modified polyphenylene ether comprising repeating units of the formula (1) and having a number average polymerization degree of 20 to 12,000, in which $0.02/X$ to $1/X$ of methyl groups at the 2- and/or 6-positions of phenylene group are substituted by aminomethyl group wherein X is a number average polymerization degree, and (B) 99 to 25% by weight of a liquid crystalline polyester.

DETAILED DESCRIPTION OF THE INVENTION

Figure 1:
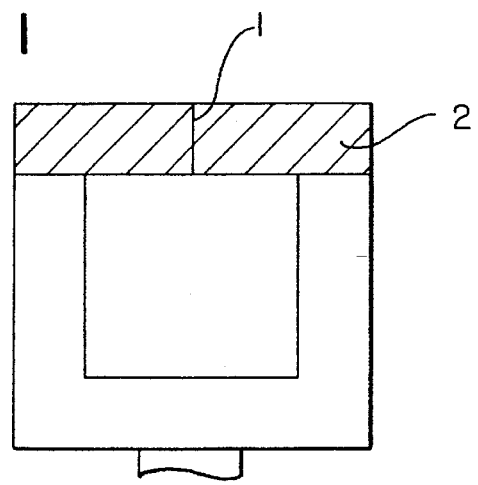
FIG. 1 is a plain view of a specimen used in measurement of weld strength.

First, the modified polyphenylene ether of the present invention will be explained.

The present invention relates to a novel modified polyphenylene ether comprising repeating units in which the methyl groups at the 2- and/or 6-positions of the phenylene groups are substituted with the aminomethyl groups ($—CH_2NH_2$). The repeating units substituted with the aminomethyl groups may be terminal repeating units, or may be present at intermediate positions of the backbone. In particular, the polyphenylene ether comprising the aminometyl-substituted repeating units as the terminal units is preferred since it can be easily prepared.

The modified polyphenylene ether of the present invention is characterized in that $0.02/X$ to $1/X$, preferably $0.05/X$ to $1/X$ of the methyl groups at the 2- and/or 6-positions of the phenylene group are substituted by the aminomethyl group wherein X is a number average polymerization degree.

When the number of the aminomethyl groups is less than $0.02/X$ of the methyl groups at the 2- and/or 6-positions of the phenylene groups, the heat resistance or the mechanical properties are not sufficiently improved when the modified polyphenylene ether is used as a component of a polymer alloy.

The modified polyphenylene ether of the present invention comprises 20 to 1200, preferably 30 to 1000 repeating units of the formula (1) on the number average. When the number of the repeating units of the formula (1) is outside this range, the processability of the resin may be deteriorated, or the mechanical properties may be insufficient.

As a polymer alloy component, the polyphenylene ether comprising the unsubstituted repeating units of the formula (1) has an insufficient reactivity with other resins, while the modified polyphenylene ether comprising the repeating units in which the methyl groups at the 2- and/or 6-positions of the phenylene groups of the polyphenylene ether are substituted by the aminomethyl groups has a good reactivity and is preferable as the polymer alloy component.

The process for preparing the modified polyphenylene ether of the present invention will be explained.

One of the preferred processes for preparing the modified polyphenylene ether of the present invention comprises polymerizing a nucleus-substituted phenol of the above formula (2) using an oxidative coupling catalyst in the presence of an amine of the above formula (3) in an amount of 0.001 to 0.2 mole per one mole of the nucleus-substituted phenol, and melt kneading the resulting polyphenylene ether.

This process is explained more in detail. In the process for polymerizing the nucleus-substituted phenol of the formula (2) in the presence of the oxidative coupling catalyst, the polymerization is carried out in the presence of the amine of the formula (3). The amine is present in an amount of 0.001 to 0.2 mole, preferably 0.005 to 0.05 mole per one mole of the nucleus-substituted phenol. When the amount of the amine is less than 0.001 mole per one mole of the nucleus-substituted phenol, any polyphenylene ether having good properties is not obtained. When the amount exceeds 0.2 mole, any polyphenylene ether having a practical molecular weight cannot be obtained.

As described above, the polyphenylene ether having the amine on the side chains can be obtained.

Herein, the nuclei-substituted phenol is a compound of the formula (2), and can be used independently, or as a mixture of two or more of the phenols.

Preferred examples of the nucleus-substituted phenol are 2,6-dimethylphenol, 2,3,6-trimethylphenol and the like. Among them, 2,6-dimethylphenol is particularly preferred.

Specific examples of the amine of the formula (3) are primary amines such as n-propylamine, isopropylamine, n-butylamine, isobutylamine, sec.-butylamine, n-hexylamine, n-octylamine, 2-ethylhexylamine, cyclohexylamine, laurylamine, benzylamine, etc.; and secondary amines such as diethylamine, di-n-propylamine, di-nbutylamine, diisobutylamine, di-n-octylamine, piperidine, 2-pipecoline, etc. A polyamine which is regarded as having the amine of the formula as a repeating unit is equivalent to the amine of the formula (3). Examples of such polyamine ar ethylenediamine, piperazine, 1,3-dipiperidylpropane, and the like.

Specifically, it is preferred to use the amine of the formula (3) and a known catalyst system comprising a copper compound, a mangnese compound or a cobalt compound and a ligand selected from bases.

There are exemplified a process comprising oxidation coupling the phenol monomer and oxygen in the presence of a catalyst comprising a manganese salt, a basic reaction medium and a secondary amine as disclosed in Japanese Patent KOKAI Publication No. 79993/1978; and a process for oxidation polymerizing the nucleus-substituted phenol with an oxygen-containing gas in an organic solvent in the presence of a catalyst comprising one or more divalent manganese salts, at least one base compound selected from the group consisting of an hydroxide alkoxide or phenoxide of a metal of the IA group of the Periodic Table and a hydroxide or oxide of a metal of the IIA group, an alkanol amine and an amine as disclosed in Japanese Patent KOKAI Publication No. 54424/1988.

By the above process, the polyphenylene ether comprising the repeating units in which the methyl groups at the 2- and/or 6-positions of the phenylene group are changed to the group of the formula (4):

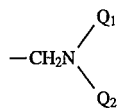

(4)

wherein $Q_1$ and $Q_2$ are the same as defined above can be obtained.

The above repeating unit to which the secondary or tertiary amine is bonded may be the terminal unit of the polyphenylene ether, or may be present in the intermediate of the backbone. In particular, the polyphenylene ether comprising the such repeating units as the terminal units is preferred since it can be easily prepared.

Then, the polyphenylene ether in which the methyl groups at the 2- and/or 6-positions of the phenylene groups are substituted by the secondary or tertiary amine is melt kneaded to obtain the modified polyphenylene ether of the present invention.

The raw material polyphenylene ether is preferably charged in a kneading apparatus under a nitrogen atmosphere.

The melt kneading is carried out at a cylinder temperature of 200° to 300° C., preferably 230° to 280° C. When the cylinder temperature is lower than 200° C., the molding processability of the raw material polyphenylene ether is not good, while when the cylinder temperature is higher than 300° C., the polyphenylene ether may be unpreferably decomposed or gelled. The melt kneading is preferably carried out while venting.

For melt kneading, conventionally used kneading apparatuses such as single or twin screw extruders, various types of kneader and the like can preferably used.

The polyphenylene ether may be melt kneaded by adding a radical initiator during kneading. Alternatively, the radical initiator can be added to the polyphenylene ether and then melt kneaded. Preferably usable radical initiators include cumene hydroperoxide, tert.-butyl hydroperoxide, dimethyl-2,5-bis(hydroperoxy)hexane, 1,3-bis(tert.-butylperoxyisopropyl)benzene, tert.-butyl peroxide, 2,6-di-tert.-butyl-4-methylphenol, and the like.

The thermoplastic resin composition of the present invention will be explained.

The component (A) of the thermoplastic resin composition of the present invention is the above described modified polyphenylene ether.

To the modified polyphenylene ether as the component (A) of the thermoplastic resin composition of the present invention, unmodified polyphenylene ether, styrene-grafted polyphenylene ether, polystyrene and the like can be added, if desired.

Preferably, the modified polyphenylene ether as the component (A) of the thermoplastic resin composition of the present invention and the raw material polyphenylene ether therefor have a reduced viscosity $\eta_{sp}/c$ (measured at 25° C. with a chloroform solution of 0.5 g/dl) of 0.30 to 0.65 dl/g. When $\eta_{sp}/c$ is lower than 0.30 dl/g, the heat resistance of the composition is severely deteriorated, while when $\eta_{sp}/c$ exceeds 0.65 dl/g, the moldability of the composition is deteriorated.

The liquid crystalline polyester as the component (B) of the thermoplastic resin composition of the present invention is the polyester which is called as the thermotropic liquid crystalline polymer.

Specific examples of such polymer are (1) a polymer comprising an aromatic dicarboxylic acid, an aromatic diol and an aromatic hydroxycarboxylic acid;

(2) a polymer comprising different aromatic hydroxycarboxylic acids;

(3) a polymer comprising an aromatic dicarboxylic acid and a nucleus-substituted aromatic diol; or (4) a polymer prepared by reacting an aromatic hydroxycarboxylic acid with a polyester such as polyethylene terephthalate.

Such polymer forms an anisotropic melt at a temperature not higher than 400° C.

In place of the aromatic dicarboxylic acid, aromatic diol and aromatic dihydroxycarboxylic acid, their ester-forming derivatives may be used.

As the repeating units of the liquid crystalline polyester, the following repeating units can be exemplified. Repeating units derived from the aromatic carboxylic acids:

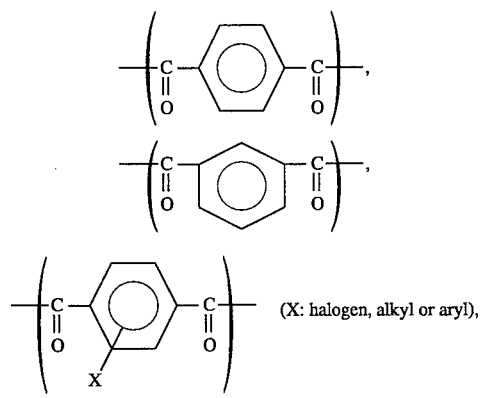

-continued

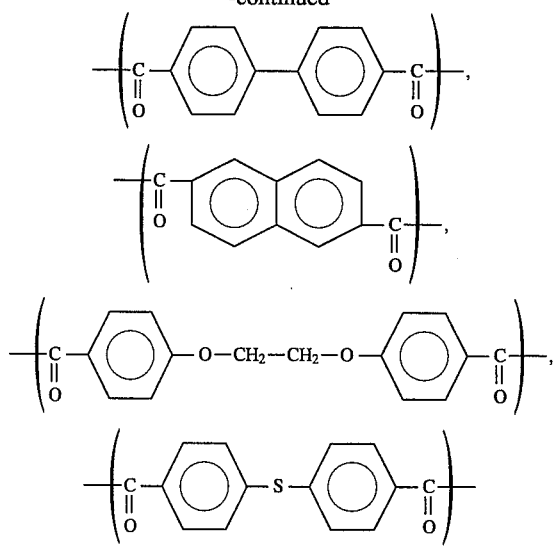

Repeating units derived from the aromatic diols:

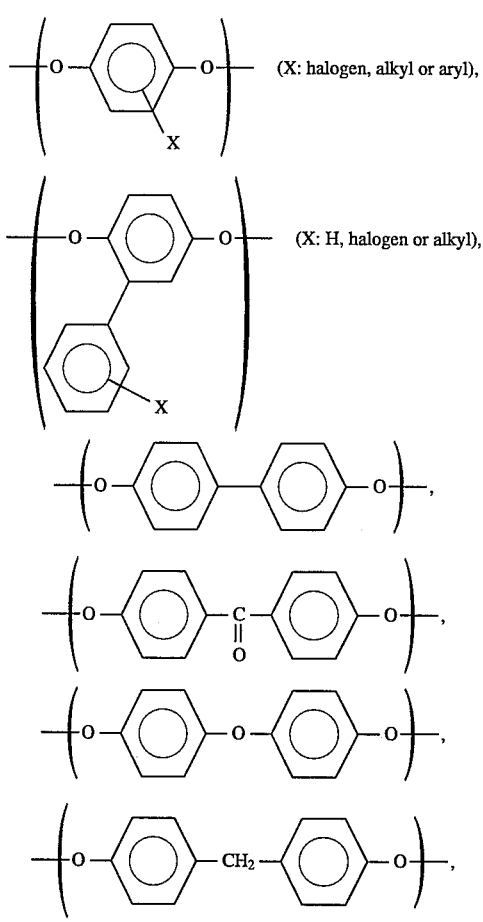

(X: halogen, alkyl or aryl), (X: H, halogen or alkyl),

-continued

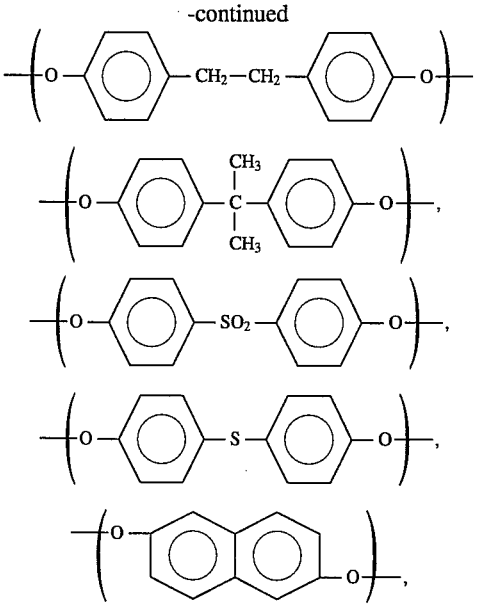

Repeating units derived from the aromatic hydroxydicarboxylic acids:

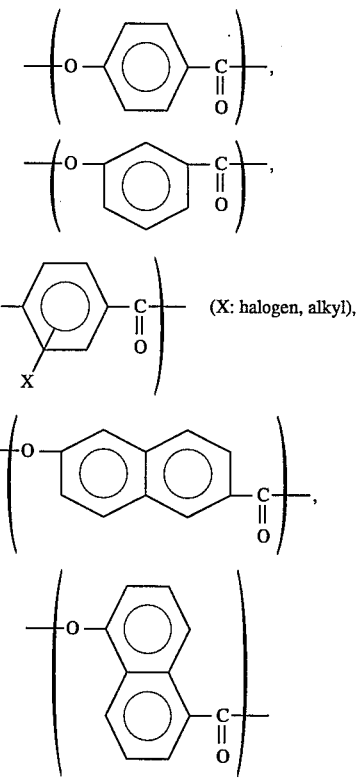

(X: halogen, alkyl),

The particularly preferred liquid crystalline in view of the balance among the heat resistance, the mechanical properties and the processability is one comprising the repeating units of the formula:

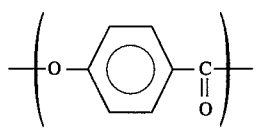

more concretely, the polyester comprising each of the combinations (I) to (V) of the repeating units:

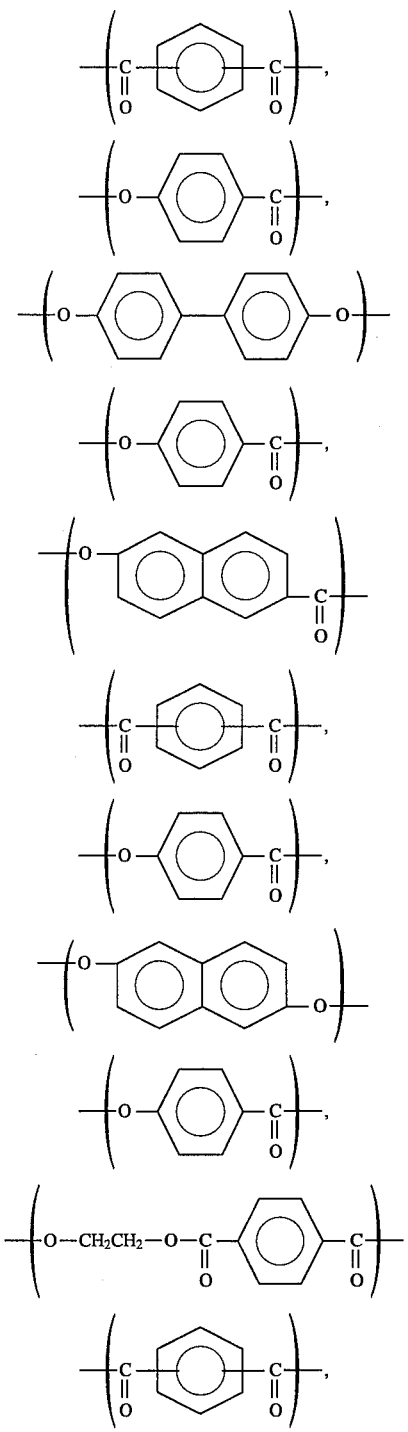

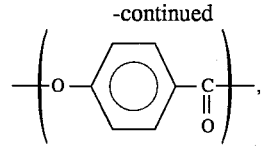

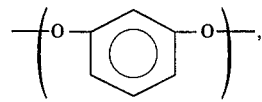

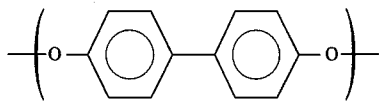

The liquid crystalline polyesters (I), (II), (III) and (IV) are disclosed in Japanese Patent Publication Nos. 47870/1972, 3888/1988, 3891/1988 and 18016/1981, respectively.

In the present invention, when a ratio of the components (A) and (B) are in the specific range, the desired thermoplastic resin composition can be obtained. Amounts of the components (A) and (B) in the present invention are preferably from 1 to 75% by weight and 99 to 25% by weight, respectively.

When the amount of the component (A) is less than 1% by weight, there is no merit in the cost, while when it exceeds 75% by weight, the composition may have insufficient heat resistance or strength.

In the thermoplastic resin composition of the present invention, preferably, the component (A) forms a dispersed phase, while the component (B) forms a continuous phase. In such case, the composition is excellent in chemical resistance, heat resistance, mechanical properties, and the like.

If desired, the thermoplastic resin composition of the present invention may contain an inorganic filler.

As the inorganic filler, there are exemplified calcium carbonate, talc, clay, silica, magnesium carbonate, barium sulfate, titanium oxide, alumina, gypsum, glass fiber, carbon fiber, alumina fiber, aluminum borate whisker, potassium titanate fiber, and the like.

If necessary, to the thermoplastic resin composition of the present invention, additional various additives such as an antioxidant, a heat stabilizer, a light stabilizer, a flame retardant, a lubricant, an antistatic agent, an organic or inorganic colorant, a rust preventive, a cross-linking agent, a foaming agent, a fluorescent, a surface smoother, a surface gloss improver, a releasing improver (e.g. a fluororesin), etc. may be added during the production step or the subsequent processing step of the composition.

As the production method of the thermoplastic resin composition of the present invention, there are exemplified a method comprising melt kneading the polyphenylene ether in the kneader to prepare beforehand the modified polyphenylene ether of the component (A), compounding the liquid crystalline polyester of the component (B) and kneading them, and a method comprising dissolving each of the above prepared modified polyphenylene ether of the component (A) and the liquid crystalline polyester of the component (B) in respective solvents, mixing two solutions, and evaporating off the solvents or pouring the mixture in a solvent in which the resin components are not dissolved to precipitate the resin composition.

Alternatively, the polyphenylene ether is charged through a first feed opening of the extruder and melt kneaded in a part of the extruder between the first feed opening and a second feed opening to prepare the modified polyphenylene ether of the component (A). Thereafter, the liquid crystalline polyester of the component (B) is charged through the second feed opening, and the modified polyphenylene ether and the liquid crystalline polyester are melt kneaded to obtain the resin composition.

In any case, it is possible to confirm that the component (A) constituting the obtained resin composition is the modified polyphenylene ether having the primary amine by, for example, extracting either the modified polyphenylene ether or the polyphenylene ether from the composition with a solvent, reprecipitating the polymer and quantitatively analyzing the amine species in the extracted component by the potentiometric titration.

While a reason why the thermoplastic resin composition of the present invention has excellent physical properties has not been clarified, it may be assumed as follows:

Since the polyphenylene ether comprising only the repeating units (1) has no reactive functional group, it has an insufficient reactivity with the liquid crystalline polyester, so that the composition comprising such polyphenylene ether and the liquid crystalline polyester may not have good physical properties.

On the other hand, since the modified polyphenylene ether which is substituted with the aminomethyl groups contains the highly reactive primary amine, the reaction may take place between the modified polyphenylene ether and the liquid crystalline polyester, and as the results, the composition may have the excellent physical properties. de

EXAMPLES

The present invention will be explained by the following Examples, which do not limit the present invention by any way. A number average molecular weight, an amount of the amine and NMR are measured as follows:

Number Average Molecular Weight

A number average molecular weight is measured by the gel permeation chromatography (hereinafter referred to as "GPC") according to a conventional manner.

Measurement of amounts of amines in the raw material polyphenylene ether and the modified polyphenylene ether -Nitrogen content in the whole amine About one gram of a sample is weighed and dissolved in chloroform (50 cc). After the addition of acetic acid (5 cc), the solution is analyzed by potentiometric titration using a potentiometric titration apparatus AT-310 (manufactured by Kyoto Electronics, Co., Ltd.) (a glass-calomel electrode, a titrant: 0.1M perchloric acid (acetic acid solution)), and the nitrogen content in the whole amine is calculated according to the following equation:

$N_T = 0.0014 \times A \times C_1 \times 100/S$

NT: Nitrogen content in the whole amine (%)
A: Titer (cc)
S: Sample amount (g)
$C_1$: Concentration of the perchloric acid solution (mole/l)

-Nitrogen content in the tertiary amine

About one gram of a sample is weighed and dissolved in chloroform (50 cc). Acetic anhydride (5 cc) was added to the solution, the solution is kept standing, and then acetic acid (5 cc) is added. Thereafter, the potentiometric titration is carried out in the same way as in the titration of the nitrogen content in the whole amine, and the nitrogen content in the tertiary amine is calculated according to the following equation:

$N_3 = 0.0014 \times B \times C_2 \times 100/S$ $N_3$: Nitrogen content in the whole amine (%)
B: Titer (cc)
S: Sample amount (g)
$C_2$: Concentration of the perchloric acid solution (mole/l)

-Nitrogen content in the secondary amine

About one gram of a sample is weighed and dissolved in chloroform (50 cc). Salicyl aldehyde (5 cc) was added to the solution and the solution is kept standing. Thereafter, the potentiometric titration is carried out in the same way as in the titration of the nitrogen content in the whole amine except that a 0.1 mole/l solution of hydrochloric acid in 2-propanol is used as a titrant. First, the nitrogen content $N_{2,3}$ in the sample (secondary amine+tertiary amine) is calculated according to the following equation:

$N_{2,3} = 0.014 \times C \times D' 100/S$

C: Concentration of hydrochloric acid for titration (mole/l)
D: Titer (cc)
S: Sample amount (g)

Thereafter, the nitrogen content $N_2$ (%) of the secondary amine contained in the sample is calculated according to the following equation:

$N_2 = N_{2,3} - N_3$

-Nitrogen content in the primary amine

The nitrogen content $N_1$ (%) of the primary amine contained in the sample is calculated according to the following equation:

$N_1 = N_T - N_2 - N_3$

NMR Measurement

Using a spectrometer AMX 600 (manufactured by Bulker), the NMR measurement is carried out at 600.14 MHz of the resonance frequency for $^1H$, and 150.92 MHz of the resonance frequency for $^{13}C$.

A sample is dissolved in $CDCl_3$ and the measuring temperature is 40° C.

Chemical shifts are calculated with the peak of $CHCl_3$ being 7.24 ppm in the case of $^1H$-NMR and with the peak of $CDCl_3$ being 77.1 ppm in the case of $^{13}C$-NMR.

The peaks of R-1 were assigned according to those described in Macromolecules, 23, 1318–1329 (1990).

Measurement of physical properties of molded article

Physical properties are measured with a molded article which is produced by kneading a composition using the PCM-30 type twin screw extruder (manufactured by Ikegai Tekko Co., Ltd.) at a cylinder temperature of 300° to 340° C. and injection molding the composition using the PS 40 E5 ASE type injection molding apparatus (manufactured by Nissei Jushi Kogyo Co., Ltd.) at a barrel temperature of 300° to 340° C. and a mold temperature of 110° to 130° C.

<Tensile strength and temperature of deflection under load (TDUL)>

An ASTM No. 4 dumbbell and a specimen for TDUL measurement (127 mm long×2.7 mm wide×6.4 mm thick) are molded and the tensile strength and the TDUL (under load of 18.6 kg) are measured according to ASTM D638 and ASTM D648, respectively.

<Flexural strength>

The flexural strength is measured with a specimen (6.4 mm thick) according to ASTM D790 (weld part strength and non-weld part strength).

From a composition of the present invention, a specimen shown in FIG. 1 is molded, which has a thickness of 3 mm, an outer size of 64 mm and an inner size of 38 mm. From the specimen, a hatched part 2 (64×13 mm) including the weld line 1 is cut out, and its flexural strength is measured at a span distance of 40 mm and a bending rate of 2 mm/min.

From a specimen having the same shape as above, a non-weld part (64×13 mm) is cut out, and its flexural strength is measured in the same way.

<Appearance of molded article>

The appearance of the molded article is evaluated according to the following criteria:

O: Appearance is good and no color change is found.

X: Color change is found on the molded article surface.

<Morphological observation of molded article>

An injection molded article is sliced with a microtome and etched with carbon tetrachloride, and the etched specimen is observed by a scanning electron microscope and classified as follows:

A: The polyphenylene ether parts (modified PPE and unmodified PPE) form dispersed phases, while the liquid crystalline polyester part forms a continuous phase.

B: The polyphenylene ether part forms a continuous phase, while the liquid crystalline parts form dispersed phases.

Reference Example 1

In a jacketed 10 liter autoclave equipped with a stirrer, a thermometer, a condenser and an air inlet tube which reached the bottom of the autoclave, xylene (3420 g), methanol (1366 g), 2,6-dimethylphenol (1222 g, 10.02 moles) and sodium hydroxide (24 g) were charged to form a homogeneous solution. Then, the solution was added to a solution of diethanolamine (33.8 g), di-n-butylamine (27.7 g, 0.233 mole corresponding to 0.0233 mole per one mole of 2,6-dimethylphenol) and manganese chloride tetrahydrate (0.99 g) dissolved in methanol (100 g).

While vigorously stirring the content, an air was bubbled through the content at 5 liter/min. The reaction temperature and pressure were maintained at 35° C. and 9 kg/cm$^2$, respectively. After 7 hours from the start of air bubbling, the air supply was stopped, and the reaction mixture was poured in a mixture of acetic acid (66 g) and methanol (4900 g). The resulting slurry was filtrated under reduced pressure to isolate a polyphenylene ether in a wet state.

After the isolated polyphenylene ether was washed with methanol (7200 g), it was dried at 150° C. under reduced pressure overnight to obtain the dried polyphenylene ether (1160 g).

The polyphenylene ether had a number average molecular weight of 6000 and a number average polymerization degree of 50. This polyphenylene ether will be referred to as "R-1."

The nitrogen contents of various amines in R-1 are shown in Table 1. From these contents, it is seen that 0.43% of the methyl groups at the 2- and 6-positions of the polyphenylene ether were substituted by the tertiary dibutylamino groups.

Example 1

The polyphenylene ether R-1 (100 parts by weight), a radical polymerization initiator (Sunperox T0, a trade name of Sanken Kako Co., Ltd.) (0.2 part by weight), an antioxidant (Irganox 1330, a trade name) (0.3 part by weight) and 2,6-di-tert.-butyl-4-methylphenol (0.2 part by weight) were mixed in a Henschel mixer, and kneaded using a twin screw extruder PCM-30 (manufactured by Ikegai Tekko Co., Ltd.) by charging it in a hopper which had been kept under a nitrogen atmosphere, at a cylinder temperature of 273° C. at a screw rotation of 80 rpm while venting. The obtained pellets were dissolved in chloroform and reprecipitated in methanol and dried. This modified polyphenylene ether had a number average molecular weight of 6800 and a number average polymerization degree of 56.7. This modified polyphenylene ether will be referred to as "A-1."

The nitrogen contents of various amines in A-1 are shown in Table 1. Comparing with the raw material polyphenylene ether, it is seen that the modified polyphenylene having the greatly decreased amount of tertiary amine and the greatly increased amount of primary amine was obtained.

TABLE 1

Results of quantitative analysis of nitrogen in the polyphenylene ether and modified polyphenylene ether

| Sample | Nitrogen contents (%) | | | |
| --- | --- | --- | --- | --- |
| | $N_T$ | $N_1$ | $N_2$ | $N_3$ |
| R-1 | 0.10 | <0.01 | <0.01 | 0.10 |
| A-1 | 0.09 | 0.07 | <0.01 | 0.02 |

From the above results, it is seen that 0.30% of the methyl group at the 2- and 6-positions of the polyphenylene ether were replaced by the aminomethylene groups.

Figure 2A:
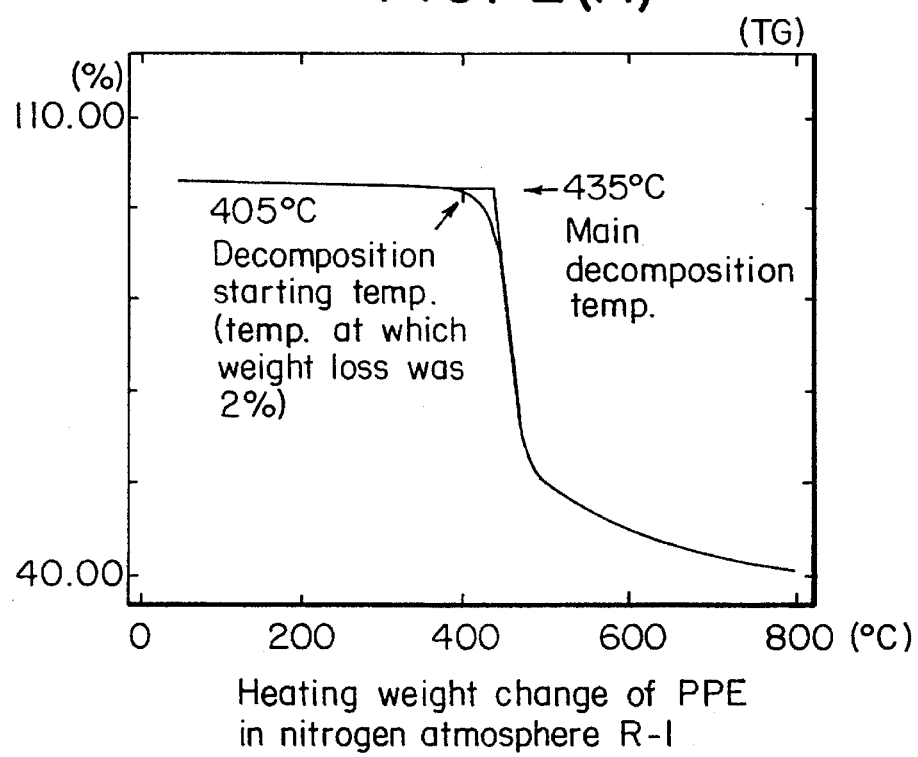
FIG. 2A and 2B show graphs of heat weight changes of polyphenylene ethers in the nitrogen atmosphere.
Figure 2B:
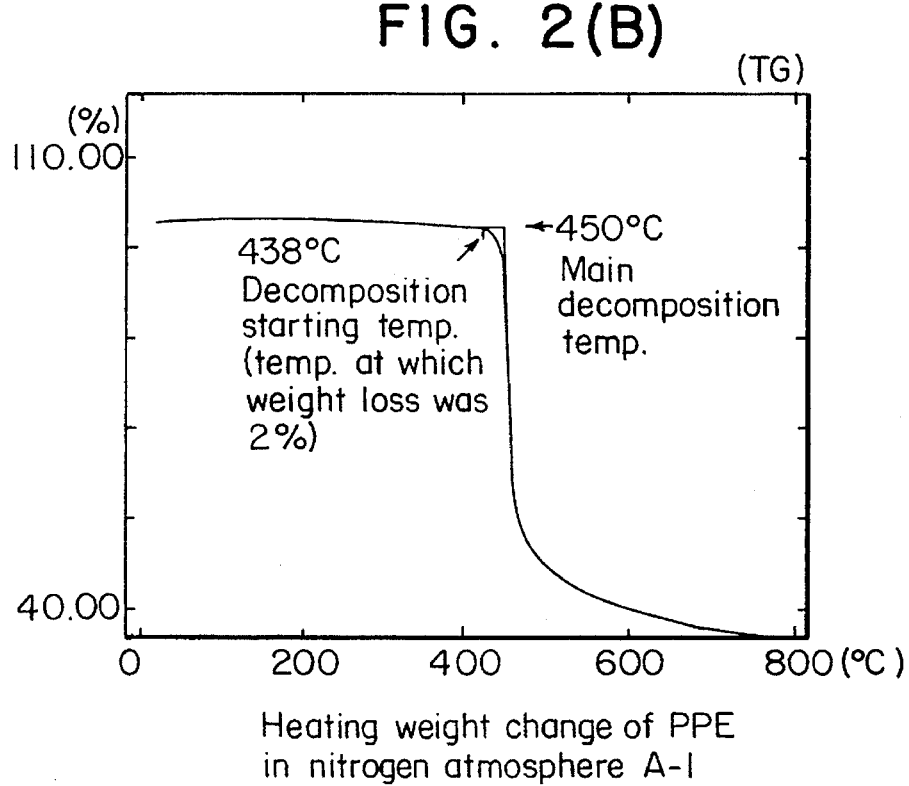

To compare the heat stability of R-1 and A-1, thermogravimetric analysis thereof was carried out using TGA-50 (manufactured by Shimadzu Corporation) at a heating rate of 10° C./min. To compensate the difference of surface areas between R-1 and A-1, A-1 was finely ground (42 mesh) till no dependency on the particle size was found in the weight-temperature curve and used in the analysis. FIG. 2 shows the results of thermogravimetric analysis measured in the nitrogen atmosphere. The graphs (1) and (2) in FIG. 2 show the results of R-1 and A-2, respectively.

In the Figure, the main decomposition temperature was obtained from an intersection between the base line and a tangent at a steepest inclination point of the base line shift, and the decomposition starting temperature was a temperature at which the weight decreased by 2%.

As seen from FIG. 2, the weight loss of R-1 started around 350° C., and the decomposition starting temperature as low as 405° C., while substantially no weight loss of A-1 was found up to around 400° C., and the decomposition starting temperature was 438° C. which was at least 30° C. higher than that of R-1. While R-1 had the main decomposition temperature of 435° C., A-1 had the main decomposition temperature of 450° C. These results show that the modified polyphenylene ether had the improved heat stability.

Figure 3:
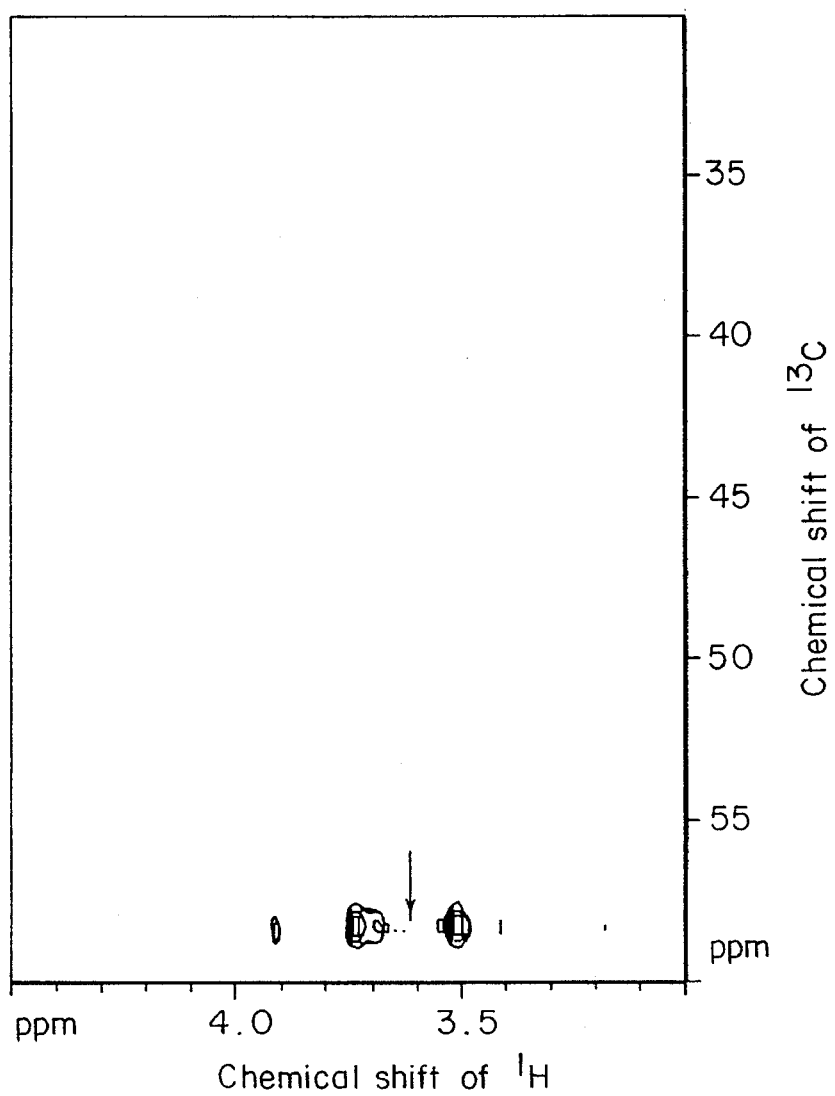
FIG. 3 is a two-dimensional HMQC NMR spectrum of the polyphenylene ether (R-1).
Figure 4:
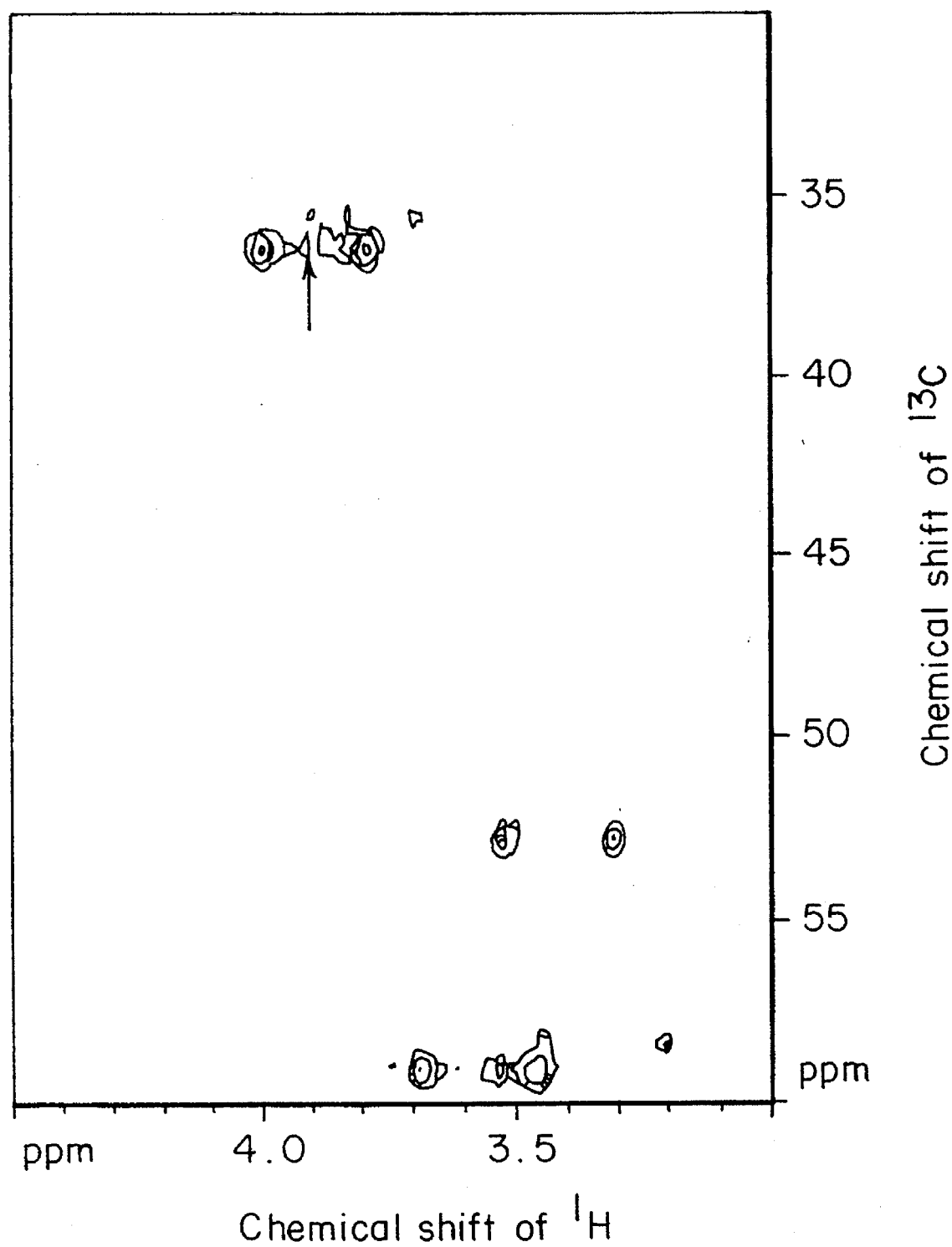
FIG. 4 is a two-dimensional HMQC NMR spectrum of the polyphenylene ether (A-1).

The two dimensional HMQC NMR spectra of R-1 and A-1 are shown in FIGS. 3 and 4, respectively.

In FIG. 3, the ordinate and the abscissa represent the chemical shifts of $^{13}C$ and $^{1}H$, respectively.

In this spectrum, since decoupling of $^{13}C$ was not effected during measurement, one signal was observed as two peaks split in the $^{1}H$ axis direction.

The $^{13}C$-NMR chemical shift of the signal was given at the peak position, and the 1H-NMR chemical shift was given as the middle point between the two split peak positions, which is shown by the arrow.

In FIG. 4, the ordinate and the abscissa represent the chemical shifts of $^{13}C$ and $^{1}H$, respectively.

In this spectrum, since decoupling of $^{13}C$ was not effected during measurement, one signal was observed as two peaks split in the $^{1}H$ axis direction.

The $^{13}C$-NMR chemical shift of the signal was given at the peak position, and the 1H-NMR chemical shift was given as the middle point between the two split peak positions, which is shown by the arrow.

The assignments of the major peaks are as follows:

In the two dimensional HMQC NMR spectrum of R-1, the signal having the chemical shifts of $^{13}$C:58.1 ppm and $^1$H:3.62 ppm is assigned to the carbon and hydrogen atoms, respectively of the methylene group at the 2- or 6-position of the phenylene group in the polyphenylene ether to which the dibutylamine is bonded according to Macromolecules, 23, 1318 (1990). The intensity of this signal greatly decreased in A-1, while the new signal having the chemical shifts of $^{13}$C:36.3 ppm and $^1$H:3.89 ppm appears. It is known that the chemical shift of a carbon atom of a methylene group in a benzyl group to which a primary amine is bonded is 39.4 ppm according to Phytochem., 18, 1547 (1979), and that the chemical shift of a hydrogen atom of the methylene group in the benzyl group to which the primary amine is bonded is 3.9 ppm according to Aldrich Library of NMR Spectra, II, 1066 (1983). Accordingly, the signal having the chemical shifts of $^{13}$C:36.3 ppm and $^1$H:3.89 ppm is assigned to the carbon atom and hydrogen atom, respectively of the methylene group at the 2- or 6-position of the phenylene group of polyphenylene ether to which the primary amine is bonded.

These results coincide with the above results of titration analysis of the amino groups.

Reference Example 2 in a polymerization tank equipped with a comb-form agitation blade, p-acetoxybenzoic acid (10.8 kg, 60 moles), terephthalic acid (2.49 kg, 15 moles), isophthalic acid (0.83 kg, 5 moles) and 4,4'-diacetoxydiphenyl (5.45 kg, 20.2 moles) were charged, heated up to 330° C. and polymerized at the same temperature for one hour while stirring in the nitrogen atmosphere. The polymerization was proceeded under vigorous stirring with removing by-produced acetic acid. Thereafter, the reaction system was gradually cooled, and the reaction mixture was removed from the tank at 200° C. The reaction mixture was ground by a hammer mill (manufactured by Hosokawa Micron Co., Ltd.) to particles of 2.5 mm or less. Then, the ground mixture was treated in a rotary kiln at 280° C. in the nitrogen atmosphere for 3 hours to obtain a particulate whole aromatic polyester having a flow temperature of 324° C. and comprising the following repeating units. This liquid crystalline polyester will be referred to as "B-1". The repeating units of the liquid crystalline polyester B-1 were as follows:

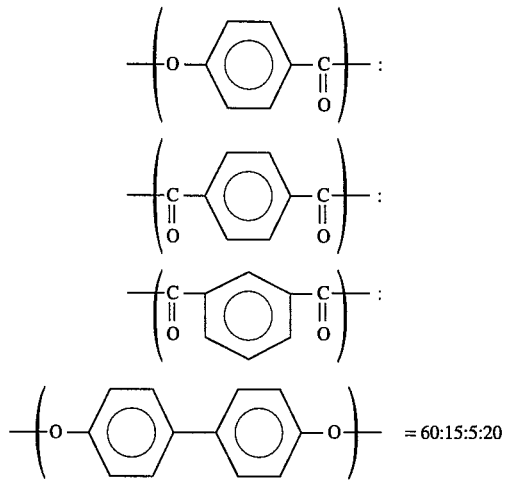

Examples 2 and 3 and Comparative Examples 1 and 2

The components having the composition of Table 2 were mixed with a stabilizer and kneaded, and then the properties were measured. The results are shown in Table 2.

Examples 4 and 5 and Comparative Examples 3 and 4

The components having the composition of Table 3 were mixed with a stabilizer and kneaded, and then the properties were measured. The results are shown in Table 3.

TABLE 2

| Example No. | Composition (wt. %) | | TDUL (18.6 kg, °C.) | Physical properties | | | Morphology | Appearance |
|---|---|---|---|---|---|---|---|---|
| | Component (A) | Component (B) | | Tensile strength (kg/cm²) | Flexural strength (kg/cm²) | Flexural modulus (kg/cm²) | | |
| 2 | A-1, 30 | B-1, 70 | 231 | 1320 | 1140 | 62000 | A | O |
| C.1 | R-1, 30 | B-1, 70 | 215 | 850 | 960 | 44000 | A | X |
| 3 | A-1, 50 | B-1, 50 | 198 | 860 | 840 | 41000 | A | O |
| C.2 | R-1, 50 | B-1, 50 | 188 | 440 | 450 | 32000 | A | X |

TABLE 3

| Example No. | Composition (wt. %) | | TDUL (18.6 kg, °C.) | Tensile strength (kg/cm$^2$) | Flexural test | | Weld test | | Morphology | Appearance |
| | Component(A) | Component(B) | | | Flexural strength (kg/cm$^2$) | Flexural modulus (kg/cm$^2$) | Weld part (kg/cm$^2$) | Nol-weld part (kg/cm$^2$) | | |
| --- | --- | --- | --- | --- | --- | --- | --- | --- | --- | --- |
| 4 | A-1, 10 | B-1, 90 | 254 | 1470 | 1100 | 64000 | 320 | 800 | A | O |
| C.3 | R-1, 10 | B-1, 90 | 233 | 1100 | 980 | 52000 | 220 | 640 | A | X |
| 5 | A-1, 40 | B-1, 60 | 206 | 950 | 920 | 47000 | 290 | 590 | A | O |
| C.4 | R-1, 40 | B-1, 60 | 202 | 680 | 690 | 40000 | 220 | 430 | A | X |

The composition of Example 2 was refluxed in chloroform for 72 hours, and the amine species in the modified PPE which is soluble in chloroform were quantitatively analyzed. Hereinafter, the modified PPE will be referred to as "A-2".

The composition of Comparative Example 1 was treated in the same manner as above, and the amine species in the PPE were quantitatively analyzed. This PPE will be referred to as "R-2".

The results of the quantitative analysis of the amine species are shown in Table 4.

TABLE 4

Results of quantitative analysis of nitrogen in the polyphenylene ether and modified polyphenylene ether

| Sample | Nitrogen contents (%) | | | |
| | $N_T$ | $N_1$ | $N_2$ | $N_3$ |
| --- | --- | --- | --- | --- |
| R-2 | 0.10 | <0.01 | <0.01 | 0.10 |
| A-2 | 0.07 | 0.05 | <0.01 | 0.02 |

It is seen that the thermoplastic resin composition of the present invention is excellent in heat resistance, various properties such as mechanical properties and melt processability, and has good appearance of the molded article. In addition it is an economical resin composition.

EFFECTS OF THE INVENTION

Since the modified polyphenylene ether of the present invention includes a highly reactive primary amine on the polymer side chain, it is preferably used in a wide range as a component of various compositions or polymer alloys. Further, it is cheap.

The thermoplastic resin composition of the present invention is excellent in heat resistance, mechanical properties and appearance and gloss of the molded article. By making use of such characteristics, it is used in the production of a molded article, a sheet, a tube, a film, fibers, a laminate, a coating material and the like, by injection molding and extrusion molding.

What is claimed is:

1. A modified polyphenylene ether comprising repeating units of the formula (1):

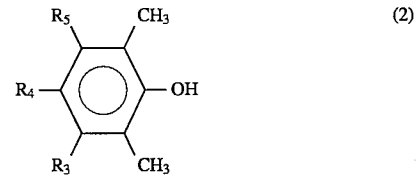

wherein $R_1$ and $R_2$ are, independently from each other, a hydrogen atom or a hydrocarbon group having 1 to 20 carbon atoms and having a number average polymerization degree of 20 to 12,000, in which 0.02/X to 1/X of methyl groups at the 2- and/or 6-positions of phenylene group are substituted by an aminomethyl group wherein X is a number average polymerization degree.

2. The modified polyphenylene ether according to claim 1, wherein both $R_1$ and $R_2$ of the repeating unit (1) are hydrogen atoms.

3. A process for preparing a modified polyphenylene ether comprising polymerizing a nucleus-substituted phenol of the formula (2):

wherein $R_3$, $R_4$ and $R_5$ are, independently from each other, a hydrogen or a hydrocarbon group having 1 to 20 carbon atoms using an oxidative coupling catalyst in the presence of an amine of the formula (3):

$$Q_1\diagdown NH \diagup Q_2 \quad (3)$$

wherein $Q_1$ and $Q_2$ are, independently from each other, a hydrogen, an alkyl group having 1 to 24 carbon atoms or an aralkyl group having 7 to 24 carbon atoms, provided that $Q_1$ and $Q_2$ are not simultaneously hydrogen atoms, or $Q_1$ and $Q_2$ are both alkylene groups and form a ring, in an amount of 0.001 to 0.2 mole per one mole of the nucleus-substituted phenol, and melt kneading the resulting polyphenylene ether in a nitrogen atmosphere at a temperature of 200° to 300° C. while venting.

4. The process according to claim 3, wherein the melt kneading is carried out in a nitrogen atmosphere at a temperature of 200° to 300° C. while venting.

5. The process according to claim 3 or 4, wherein the melt kneading is carried out in the presence of a radical initiator.

6. The process according to claim 5, wherein said radical initiator is at least one compound selected from the group consisting of cumene hydroperoxide, tert.-butyl hydroperoxide, dimethyl-2,5-bis(hydroperoxy)hexane, 1,3-bis(tert.-butylperoxyisopropyl)benzene, tert.-butyl peroxide and 2,6-di-tert.-butyl-4-methylphenol.

7. The process according to claim 3 wherein said amine of the formula (3) is at least one amine selected from the group consisting of n-propylamine, isopropylamine, n-butylamine, isobutylamine, sec.-butylamine, n-hexylamine, n-octylamine, 2-ethylhexylamine, cyclohexylamine, laurylamine, benzylamine, diethylamine, di-n-propylamine, di-n-butylamine, diisobutylamine, di-n-octylamine, piperidine and 2-pipecoline.

8. The process according to claim 3, wherein said nucleus-substituted phenol is 2,6-dimethylphenol and/or 2,3,6-trimethylphenol.

9. A liquid crystalline polyester resin composition comprising (A) 1 to 75% by weight of a modified polyphenylene ether comprising repeating units of the formula (1):

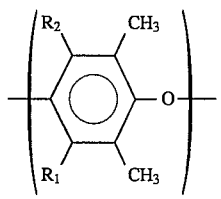

wherein $R_1$ and $R_2$ are, independently from each other, a hydrogen atom or a hydrocarbon group having 1 to 20 carbon atoms and having a number average polymerization degree of 20 to 12,000, in which $0.02/X$ to $1/X$ of methyl groups at the 2- and/or 6-positions of phenylene group are substituted by aminomethyl group wherein X is a number average polymerization degree, and (B) 99 to 25% by weight of a liquid crystalline polyester.

10. The thermoplastic resin composition according to claim 9, wherein the modified polyphenylene ether as the component (A) has a reduced viscosity $\eta_{sp}/c$ (measured at 25° C. with a chloroform solution of 0.5 g/dl) of 0.30 to 0.65 dl/g.

11. The thermoplastic resin composition according to claim 9, wherein said component (A) forms a dispersed phase, and said component (B) forms a continuous phase.

* * * * *